JIŘÍ HRDINA INVENTOR.

BY Paul Smolka,
HIS ATTORNEY

JIŘÍ HRDINA INVENTOR.
BY Paul Smolka,
HIS ATTORNEY

JIŘÍ HRDINA INVENTOR.
BY Paul Smolka,
HIS ATTORNEY

United States Patent Office 3,559,458
Patented Feb. 2, 1971

3,559,458
SAMPLE-SUPPLY DEVICE FOR CHROMATOGRAPHIC ANALYSIS APPARATUS
Jiří Hrdina, Prague, Czechoslovakia, assignor to Ceskoslovenska akademie ved, Prague, Czechoslovakia, a corporation of Czechoslovakia
Continuation of application Ser. No. 499,544, Oct. 21, 1965. This application Aug. 29, 1968, Ser. No. 764,010
Claims priority, application Czechoslovakia,
Nov. 4, 1964, 6,128/64
Int. Cl. G01n 21/08, 31/06
U.S. Cl. 73—23.1
2 Claims

ABSTRACT OF THE DISCLOSURE

A device for the supply of a fluidal medium to be analyzed into the column of a chromatographic apparatus wherein the said fluidal medium is by means of a multiway valve alternately supplied with an eluent medium to a capillary sample receptacle from which it is fed into the column alternately with an eluent by means of another multiway valve.

This case is a continuation of Ser. No. 499,544, filed Oct. 21, 1965, now abandoned.

Subject of the present invention is sample supply device for chromatographic analysis apparatus from sample receptacle beyond the pressure circuit by an extremely simple and technically unpretentious manner.

By hitherto used methods of analyzing liquids in the columns by column chromatography especially ion-exchanging columns it is necessary to transfer the samples manually in delicate and time consuming manner. In said methods an opening of the column is required followed by emptying the liquid volume over the column, then by an accordingly bent pipette to fill up the desired amount of sample to be analyzed carefully down the wall closely over the column said sample being so pushed by pneumatic pressure that it just penetrates into column without permitting air to enter; then a repeated washing of the walls and pushing in of the wash liquid is required, followed by a careful filling up the emptied liquid volume manually by an eluting buffer so that all spaces are filled before the column is closed and the chromatography process started. A method is known too in which a sample is positioned into a capillary tube, which by means of several manually operated valves is inserted in the buffer stream. Finally, gaseous chromatography apparatus are known in which by switching over of several hydraulic circuits a special multiway valve connects a loop containing a sample, to the gas stream circuit. All said apparatus are placed or connected to the tubing leading from the pump or another pressure generator, which enables the flow of the moving phase to and through the column. For that reason the column has to perfectly resist the pressure of the moving phase before said column. Such pressure can reach in modern apparatus several atmospheres even up to 100 atmospheres and therefore the apparatus requires high tightness especially should it permit dosing of several circuits or of a great number of samples, and simultaneously an easy opening and an easy transfer of samples to the sample receptacles.

The subject of the invention consists therein that into the suction branch of a pump which sucks eluent from eluent reservoirs and delivers it into the closed column, in advance filled up sample receptacles are successively connected and the samples contained therein are transferred into the column whereby said sample receptacles are advantageously washed out by the eluent, said samples or further solutions are sucked into the individual sample receptacles advantageously over a hydraulic brake up to the calibration gauge line on the sample receptacles.

Apparatus for carrying out the process according to the invention is schematically shown on attached drawings.

Figure 1:
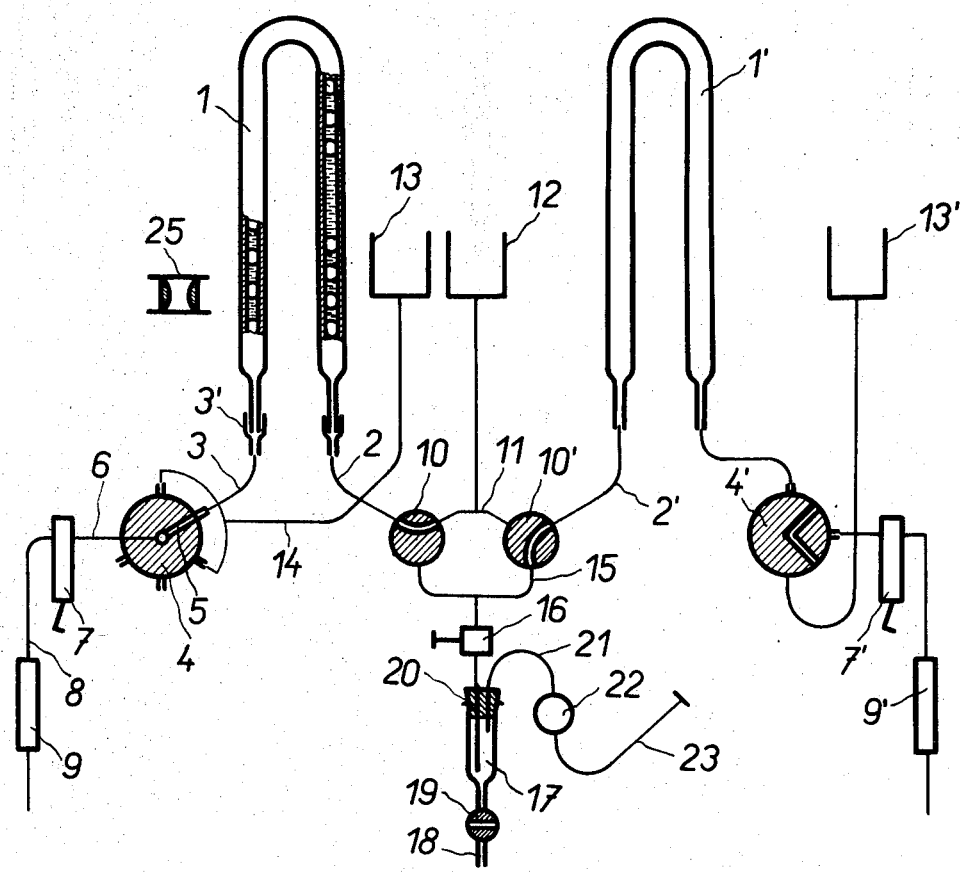
FIG. 1 shows the whole arrangement of the dosing apparatus.

FIG. 1 shows schematically the whole arrangement of the dosing apparatus with the sample receptacle 1, shaped as a bent capillary tube with tapered ends to permit a connection of the inlet and outlet rubber tubes 2 and 3. The inlet rubber tube 2 can be joined to the corresponding end of the receptacle 1 in a detachable manner and needs not to be a capillary tube. On the other hand the outlet rubber tube 3 must be a capillary one allowing the inserting of its extended mouth on the other end of the receptacle 1, avoiding thus any dead spaces. The simplified way to do it is to slide a short piece of rubber tubing on the tapered end of the receptacle 1 as well as on one end of the rubber tubing 3, which is connected by its other end firmly to one of the peripheral throats of the multiway valve 4. The rotatable plug of the valve 4 contains a passage 5 leading into a central throat to which the sucking tubing 6 of the pump 7 is connected, which delivers the sucked liquid or the separating bubbles through the tubing 8 to the column 9, if need be. The multiway valve 4 serves for introducing different liquids into the column 9, mainly eluent buffers, and in short fixed time periods also individual samples, placed before in the receptacle 1. Buffers separating the individual samples in the capillary receptacle 1 can be also used so that in one working cycle only one sample together with a portion of the separating buffers is delivered to the column 9. It is useful for the individual samples to be separated from the covering buffers by small bubble pistons and for the individual columns of the covering buffers to be divided into several sections, mutually separated also by help of bubble pistons. The proper transfer of the sample is in this way quick and easy and the sticking even of small residues on the walls of the receptacle 1 and on the rest of the tubing is thus avoided. The bubble pistons and individual sections of the protective buffers serve this purpose extremely well, especially in the case of the capillary receptacles 1 or other tubings are on their walls sufficiently durably hydraulically washed.

The automatic multiway valve 4 switches successively the particular connections joined to its peripheral throats. The successive switching is accomplished step by step by rotating of the plug of the valve 4 so that its passage joins hydraulically the particularly peripheral throats with the central throat and thus with the suction tubing 6.

To enable sucking of the sample from the receptacle 1 it is necessary that the other end of said receptacle to which the inlet tubing 2 is connected, should be joined by said tubing 2 to the free air space or to any gaseous space, or advantageously over the manual three-way valve 10 to the tubing 11 which is connected to the reservoir of a suitable liquid. Said liquid can advantageously be again the same buffer as the first stabilizing and eluent buffer within the reservoir 13, connected by tubing 14 to both peripheral throats of the multiway valve mentioned above for the supply of said buffer. For this reason both receptacles 12, 13 can eventually be united.

The manual three-way valve 10 can be switched from the position show in FIG. 1 to the position in which the inlet tubing 2 and therefore also the receptacle 1 are connected to the tubing 15 leading over the adjustable hydraulic brake 16 to the apparatus, enabling comfortable sucking of particular samples and preserving buffers including bubble pistons. Said sucking apparatus can be executed in the shape of a glass jar 17, extending on its lower part into the outlet tubing 18 with the valve 19. Into the space of the receptacle 17 closed by a plug 20, leads besides the tubing 15, passing the hydraulic brake 16, also the further tubing 21, which is connected to the flexible tubing 23 over the cavity 22. Through the end of said tubing 23 it is possible to suck by mouth successively in the receptacle different samples preserving buffers and bubble pistons in a very sensitive manner supposing the suitable adjustment of the hydraulic brake 16.

Figure 1A:
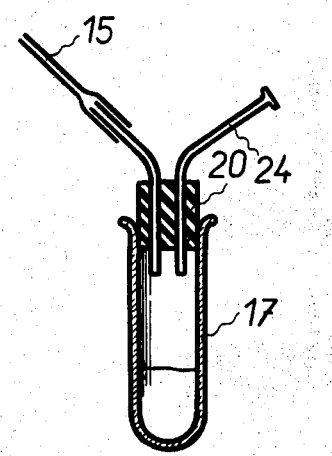
FIG. 1a shows the modification of the suction apparatus in the bigger scale.

FIG. 1a shows the simplification of said sucking apparatus. Through the plug 20 of receptacle 17 passes besides the tubing 15 leading to the manual three-way valve 10, also a simple mouthpiece 24. The whole sucking apparatus according to FIG. 1a is operated similarly to a pipe.

Before the samples and buffers are sucked into the receptacle 1, it is necessary to slip off the connecting end 3' of the outlet tubing 3 from the tapered end of the capillary receptacle 1. Said end 3' is to be dipped below the level of the sample and possibly the buffer. In this way liquid is sucked into the receptacle 1, whereas when the level falls below the mouth of the receptacle, air is sucked into the receptacle 1. Said sucking in can be carried out by moderate speed due to the hydraulic flow adjuster 16 or can be stopped by closing of the manual valve 10, so that an extreme precise sucking of a predetermined volume of the particular samples and bubble pistons is accomplished. The checking of the coincidence of the particular interfaces with corresponding marks can be sensitively improved by optical means such as the lens system 25.

Figure 1B:
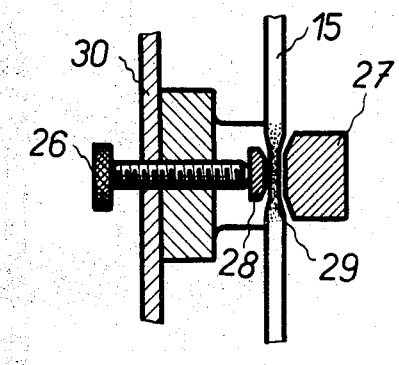
FIG. 1b shows the advantageous shape of the hydraulic brake.

A possible embodiment of the hydraulic brake or hydraulic flow adjuster 16 is shown in FIG. 1b. The tubing 15, made from elastic or plastic material, is adjustably clamped by means of the screw 26 between two clamping jaws 27, 28. The fixed jaw 27 can be made from one piece of material suitably cut out and containing a nut for said screw 26. To obtain a fine control of the hydraulic resistance from the brake or adjuster 16 it is advisable to insert into the tubing 15, containing liquid, in the place where it is clasped between the jaws 27 and 28, a porous compressible material such as a cotton plug 29. The entire hydraulic brake or flow adjuster 16 can be attached to a covering base board 30 through which just passes the head of the control screw 26. Similarly can the manual valve 10 be located behind the board 30, only its control knob or head protruding therethrough.

FIG. 1 shows in fact use of the apparatus with the hydraulic brake or flow adjuster for a plurality of columns such as the two columns 1 and 1' as applicable to the rational analysis of aminoacidic mixtures. The right half side of the FIG. 1, symmetric to the described left one, is principally of the same significance and function, only on the right side the valve 41' is a three-way valve sufficient for current analysis in column 9' for portions of a basic amino acid.

The pump 7' delivers into the column 9' just one buffer from the reservoir 13' while manual valve 10' connects the tubing 2' to the reservoir 12 similarly to the left side of FIG. 1.

In the arrangement according to FIG. 1 the switching valves 4, 4' can be automatic and they must be able to be switched on for sucking of particular samples from receptacles 1 or 1' for a short and relatively accurately measured time, which corresponds to the certain preselected number of cycles of the particular pump, keeping the proper phase orientation in the switching of the pumps.

Figure 2:
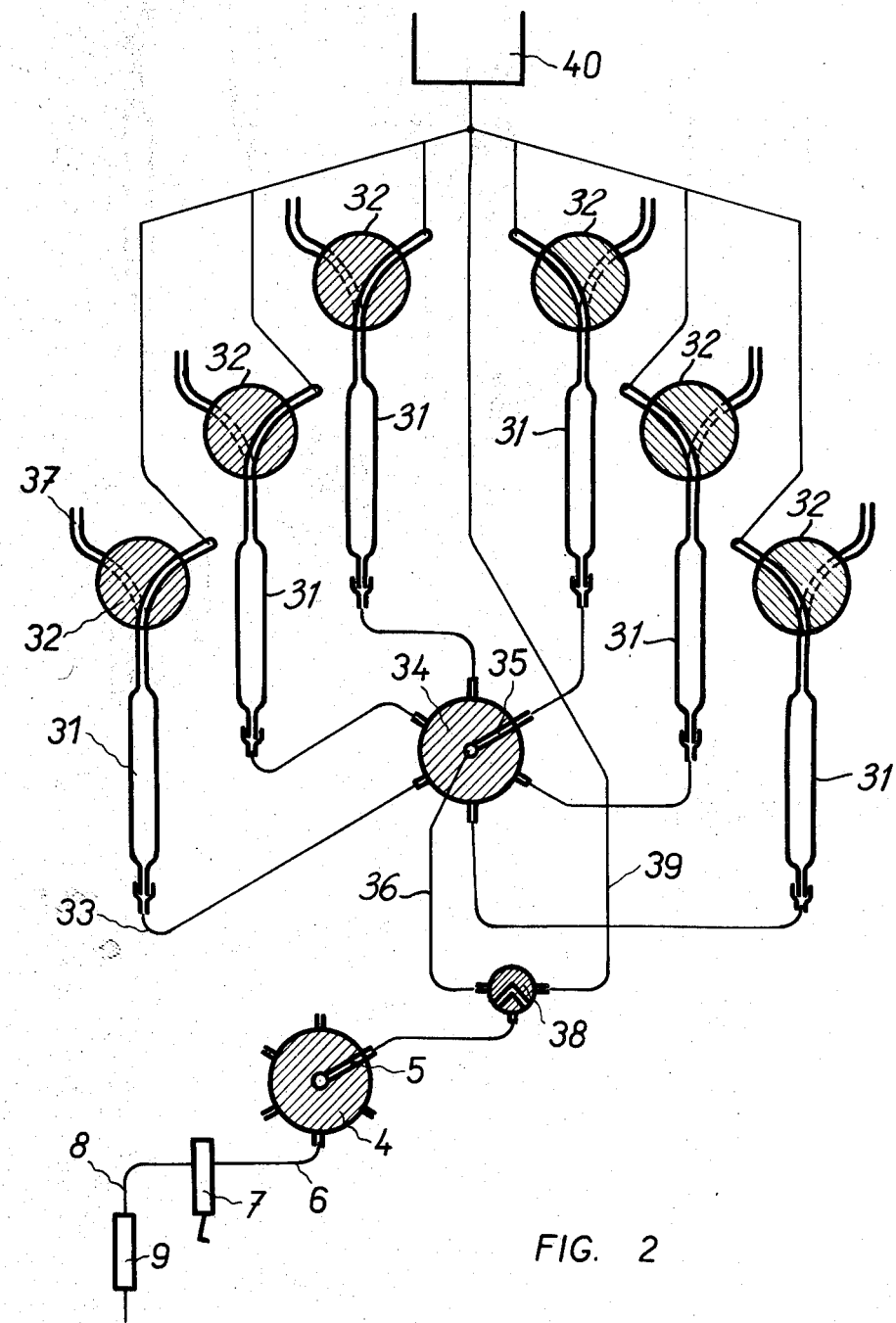
FIGS. 2, 3, 5 show modifications of the dosing apparatus.
Figure 3:
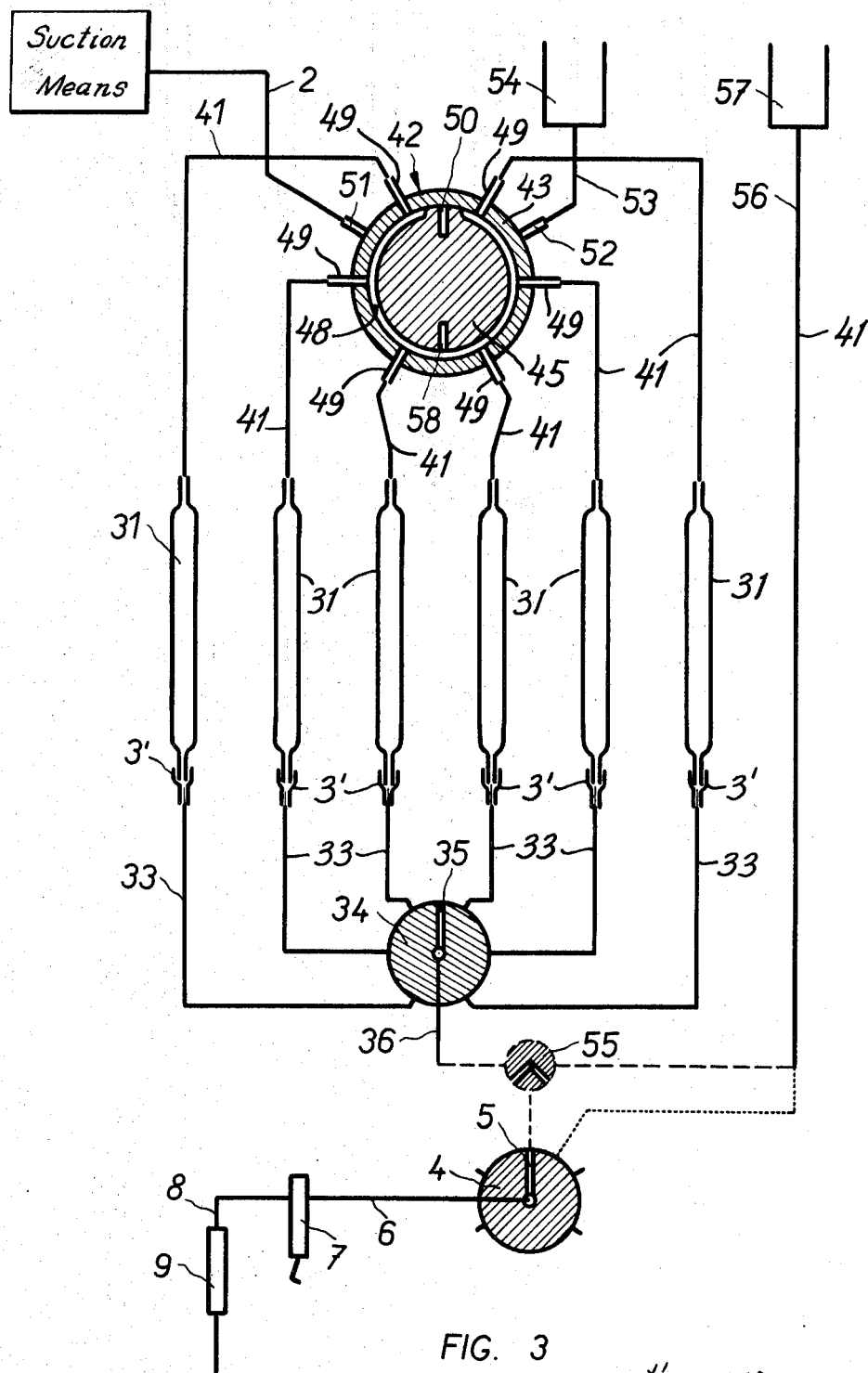
Figure 5:
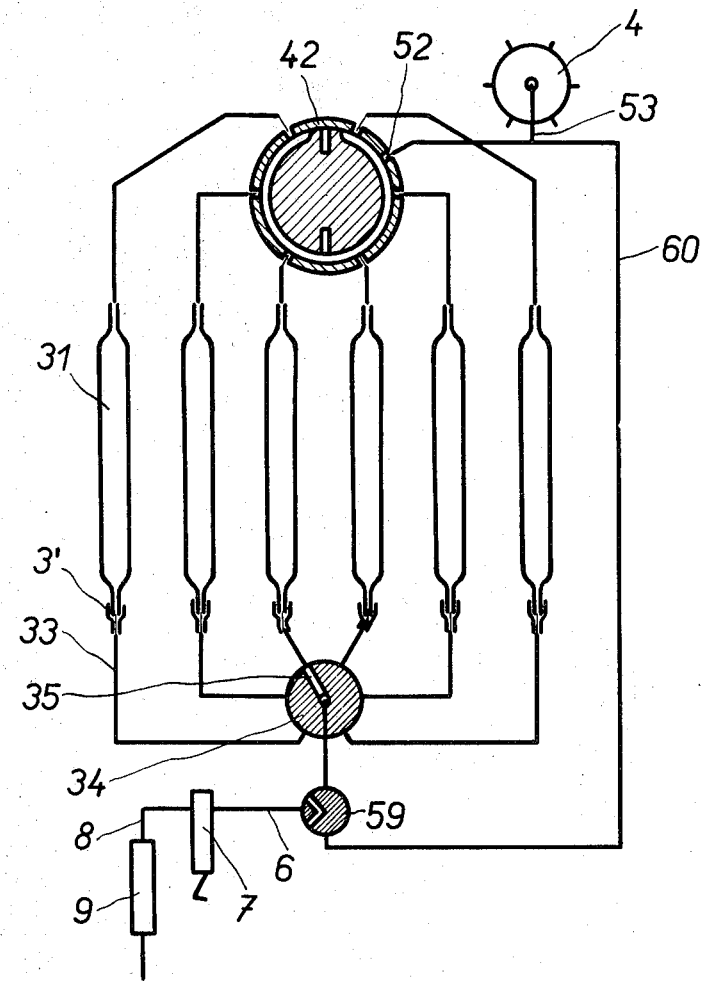

The just mentioned condition and the equipment for its fulfilling are however not necessary in the execution of pressureless dosing apparatus according to FIGS. 2, 3 and 5.

These apparatus differ principally from the apparatus according to FIG. 1 in that the particular samples to be analyzed in particular columns are not transferred one after the other into the same single receptacle designated for the single column, but are transferred into more receptacles, advantageously capillary ones, each of them containing possibly one sample only, the particular receptacles being successively connected to the capillary suction tubing of the respective pump over another multiway cock.

One possible embodiment serving the just described principle is schematically shown in FIG. 2.

Each of the particular capillary receptacles 31 is connected by its upper end to the special three-way i.g. glass valve 32, for instance over a noncapillary and not dismantable tubing. The lower tapered end of capillary receptacle 31 is however disconnectably attached as shown in FIG. 1 to the capillary tubing 33 leading to one of peripheral throats of multiway valve 34. The passage 35 of the rotatable plug of the cock 34 leads successively to particular peripheral throats of the valve 34 and therefore connects particular receptacles 31 with the central tubing 36 of the valve 34 so that said capillary tubing leads to one of the peripheral throats of the multiway valve 4.

Each of the valves 32 secures the connection of the upper end of the capillary receptacle 31 to the receptacle 40 for admission of the corresponding buffer as indicated in full lines. The plug of valve 32 containing the connecting passage can be turned into the position shown in dotted lines when the capillary receptacle 31 is connected with the end of tube 37. To said end of tube 37 connects a tubing leading as shown in FIG. 1 over the hydraulic brake or flow adjuster to the suction apparatus. It is also possible to connect simultaneously all tubings 37 coming from valves 32 permanently to a common tubing leading over the hydraulic brake to the suction apparatus as described above and shown in FIG. 1.

The process of suction of samples to the particular capillary receptacles 31 is the same as described with reference to FIG. 1, only with the difference that in the particular receptacle 31 possibly only one sample is sucked in, even without separating bubble pistons and covering buffers.

Whereas in the apparatus shown in FIG. 1 the flow through the particular receptacles 1 may last just a short time, the flow through the particular receptacles 31 according to the arrangement shown in FIG. 2 can be longlasting. It is useful to complete the apparatus in such a way that the suction into the particular receptacle 31 can be effected any time without necessitating the arrest of pump 7. For this purpose the three-way valve 38 is inserted into the central tubing 36 so that the throat of multiway valve 4, ready for receiving the sample, can be connected by the valve 38 either to the central tubing 36 or to the tubing 39 leading to the reservoir 40 of the corresponding buffer.

FIG. 3 shows another embodiment for carrying out the process of pressureless dosing. The capillary receptacles 31 are with their upper ends permanently connected by tubings 41 to the hydraulic distributor 42 whose inner arrangement can be seen from the section shown in FIG. 4.

Figure 4:
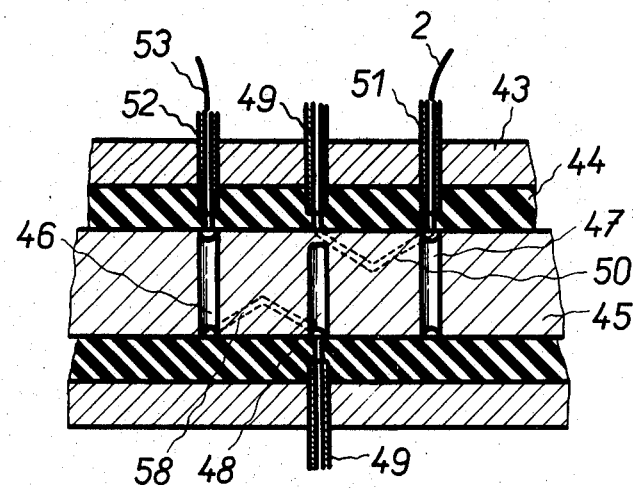
FIG. 4 shows a portion of the hydraulic valve means of FIG. 3 in an exploded section.

As shown in FIG. 4 the sealing member 44 made from elastic or plastic material (i.e. from P.T.F.E., silicon rubber, or the like) is situated in the rigid casing 43 of said distributor. This member 44 seals the rotatable cylindrical plug 45 which has three grooves, 46, 47, 48 of which the two external 46, 47, are not interrupted over the whole circumference of the plug 45, whereas the next groove 48 situated between grooves 46, 47 is interrupted by a bridge in one place being shown in upright position in FIG. 3. The interruption in passage 48 is smaller in angular dimension than the spacing of the peripheral throats 49 to each of which by help of tubing 41 (FIG. 3) one of capillary receptacles 31 can be connected. In the middle of the interruption of the passage 48 ends is a passage 50 (FIG. 4) which may have a cranked shape. Said passage 50 in suitable position of the plug 45 can connect any of peripheral throats 49 with the groove 47 and therefore with the throat 51 which leads in the groove 47. Thus the connection of any of the capillary receptacles 31 with the inlet tubing 2 connected to the throat 51 can be executed. The particular capillary receptacles 31 can be filled successively following the process described above after removing the detachable connection 3' from the flexible capillary tubing 33 (FIG.3).

The interrupted circumferential groove 48 of the plug 45 is connected by the passage 58 to the other uninterrupted circumferential groove 46 (FIG. 4) in which the hydraulic connection with the peripheral throat 52 leads to which the tubing 53 leading to the reservoir 54 with the first eluent buffer is connected.

By sucking in of the new samples in the particular capillary receptacles 31 even after said receptacle has sively connected by the passage 50 to the inlet tubing 2. The receptacles being filled, the plug 45 must be turned into the position in which the passage 50 is situated between any two peripheral throats 49. Thus the inlet tubing 2 ends blind, and the inlet tubing 53 for leading the buffer from reservoir 54 (FIG. 3) is connected by throat 52, the groove 46 and the connecting channel 58 to the incomplete groove 48, which in said position hydraulically connects the tubing 53 simultaneously with all particular tubings 41 leading to the individual receptacles 31. Said receptacles 31 are then emptied and washed out successively according to the program executed by switching the multiway valves 34 and 4, advantageously automatically by means of their driving mechanisms answering to the impulses of the central programming installation.

After filling the particular receptacles 31 successively by switching of the plug 45 of the distributor 42, the particular receptacles 31 with their lower ends are again connected with their capillary tubings 33 to the particular peripheral throats of the multiway hydraulic valve 34 executed in the same shape and operating in the same way as described in view of FIG. 2.

If, as seen from the FIG. 3, the capillary tubing 36 connected to the central outlet of the multiway valve 35, is directly connected to one of the peripheral throats of the multiway valve 4, the eluent is pumped over one of capillary receptacles 31 even after said receptacle has been emptied from the corresponding sample. But during this time the corresponding capillary receptacle 31 could not be filled up. This restriction can be removed by several methods two of which are shown on FIG. 3. The valve 55 shown in dotted lines, inserted into the central tubing 36, permits instead of a longlasting sucking of eluent over some of receptacles 31, that after switching of the three-way manual valve 55, the corresponding peripheral throat of the multiway cock 4, is directly connected through tubing 56 to reservoir 57 of the corresponding buffer. The switching being executed, the multiway valve 34 and therefore also the particular receptacles 31 are completely disconnected within the circuit of the pump 7 and can be filled up during the switching time. The switching of the valve 55 to the inlet by tubing 56 cannot be executed in the period while for example by a fully automatic apparatus the pumping of the sample from any of receptacles 31 is executed. The time needed for such repumping and the following washing out of the receptacle and of the tubing is always very short. Besides it is necessary to take care that the switching of the valve 55 to reservoir 57 should be executed in such a way that the corresponding buffer according to the elution program should be pumped by the pump 7 from the reservoir 57 to the column 9.

The buffer needed can possibly be the same as the one in the reservoir 54 and both reservoirs can possibly be put together.

The advancing gradient elution, achieved step by step by switching of multiway valve 4 to the connections of reservoirs of other eluent buffers, switches automatically its peripheral throat to which the central tubing 36 and therefore the whole system of dosimetres is connected, so that in periods except for the first degree of elution all dosimetres are able to be filled even without inserting of three-way valve 55 together with the arrangement of the tubing to the valve 55 (shown in dotted lines).

A similar result, as by inserting of three-way valve 55, could be achieved by the circuit shown in dotted lines in FIG. 3; the tubing is directly connected to one of the peripheral throats of the valve 4. By switching the passage 5 of the valve 4 after completing the sucking in of the sample from any of capillary receptacles 31, the switching to tubing 56 and reservoir 57 is executed, so that all particular receptacles 31 are ready for transfer of new samples except for the short time necessary for sucking out of the sample from any of receptacles into the column 9.

The circuit according to FIG. 3 has the disadvantage that the samples have to pass successively through two multiway valves 34 and 4 in addition to the pump 7. This small disadvantage can be removed by the connection schematically shown in FIG. 5. The particular receptacles 31 are connected as described before to the multiway valve 34. The difference in comparison to the circuit according to FIG. 3 consists therein that said valve 34 is successively connected to the suction tubing 6 of the pump 7 either directly or over the three-way valve 59. The changing of particular eluent buffers is effected by the multiway valve 4 which according to FIG. 5 precedes the distributor 42. Said valve 4 connects by tubing 53 to the peripheral throats 52 which lead to the groove 46 of the plug 45 of the distributor 42 as described in relation to the FIG. 3 and to the FIG. 4.

The valve 4 permitting particular eluent buffers and possibly regenerative lye to enter the tubing 6 leading to the pump 7 and into the column 9 is a part of the inlet system of some of the receptacles 31 as well. Therefore by connecting as shown in FIG. 5 and as described, the buffer and possibly the regeneration lye would flow through any of the receptacles 31. As a result thereof it would appear that one of the receptacles 31, especially the one through which the buffer flows, would be filled up during a period other than that of the other receptacles.

This disadvantage can be removed very easily by inserting of a three-way valve 59 in the suction tubing 6 of the pump 7. Thus through switching of three-way valve 59, a connection of the sucking tubing 6 through tubing 60 to the tubing 53 is directly effected and therefore also to the central outlet of the multiway valve 4. With the exception of a short period during which one of the receptacles 31 cannot be filled up, it is at any time possible to fill up all receptacles with new samples. A certain advantage of the arrangement according to FIG. 5 consists also therein that through the whole hydraulic system including receptacles 31 pass not only all buffers, which in gradient elution have a bigger eluent ability, but even the regenerative lye. This fact guarantees minimizing of minute amounts which may remain in the apparatus. This advantage arises at extremely high sensibilities only as with the before mentioned other means a sufficient washing of said conduits and receptacles in normal analysis can be effectuated.

There are of course possible many modified embodiments of the apparatus according to the invention, not only with regard to the circuits, but also with regard to the technical execution of particular parts such as of the hydraulic valve according to FIG. 4.

I claim:
1. A device for the pressureless supply of samples to a column in chromatographic analysis apparatus comprising the combination of:
  a plurality of sample receptacles;
  at least one eluent supply reservoir;
  suction means for drawing samples into said plurality of sample receptacles;
  distributor means for selectively fluidically connecting said suction means or said at least one eluent supply reservoir to one of the ends of said plurality of sample receptacles;
  a plurality of tubular members having one of the ends thereof removably connected to the other of the ends of said plurality of sample receptacles;
  first multiway valve means connected to the other of the ends of said plurality of tubular members for selectively permitting flow of a sample from a select one of said plurality of sample receptacles;
  second multiway valve means connected to said first multiway valve means and said at least one eluent supply reservoir for selectively permitting flow from said first multiway valve means or said at least one eluent supply reservoir and adapted to be connected to a pumping means having the inlet end thereof the outlet end thereof connected to the inlet of a chromatographic column for pressureless drawing a sample from at least one of said plurality of sample receptacles.

2. In a device for the pressureless supply of samples to a column in chromatographic analysis apparatus as defined in claim 1 wherein said distributor means comprises:
  a casing having a sealed cavity therein;
  a plug positioned within the cavity and having at least three peripherally extending grooves including,
    a first completely peripherally extending groove connected by a radialy extending throat through the periphery of said casing to said suction means,
    a second completely peripherally extending groove connected by a radially extending throat through the periphery of said casing to said at least one eluent supply reservoir, and
    a third peripherally extending groove being interrupted by a bridge in at least one location, said groove being connected by a plurality of radially extending throats through the periphery of said casing to said plurality of sample receptacles,
  said first groove being further connected to the outer periphery of said plug through said bridge by a longitudinally extending passage within said plug for connecting said suction means with a select sample receptacle and said second groove being further connected to said third groove by a longitudinally extending passage within said plug for connecting said eluent supply and said plurality of sample receptacles.

References Cited
UNITED STATES PATENTS

| | | | |
|---|---|---|---|
| 2,972,888 | 2/1961 | Lamkin | 73—23.1X |
| 2,981,092 | 4/1961 | Marks | 73—23.1 |
| 3,156,548 | 11/1964 | Perry | 73—23.1X |
| 3,032,953 | 5/1962 | Micheletti | 73—23.1X |

RULAND RICHARD QUEISSER, Primary Examiner

E. J. KOCH, Assistant Examiner

U.S. Cl. X.R.

73—61.1